Patented Dec. 17, 1940

2,225,150

UNITED STATES PATENT OFFICE 2,225,150

PORTLAND CEMENT

Ira C. Bechtold and Harry E. Kaiser, Colton, Calif., assignors to California Portland Cement Company, Los Angeles, Calif., a corporation of California No Drawing. Application January 14, 1939,
Serial No. 251,046

11 Claims. (Cl. 106—27)

This invention relates generally to improvements in Portland cements and has for its primary object to provide Portland cements having certain individual or combined properties, principally with respect to plasticity, workability and low specific gravity, that render them superior to the ordinary Portland cements for a variety of particular uses. The present application is a continuation in part of our copending application Serial Number 199,685 filed April 2, 1938, for Portland cements.

One of our main purposes is to provide a Portland cement capable of forming cementitious mixtures, whether as neat cements, aggregate containing cements, or concrete, of abnormally low specific gravities, i. e., abnormally in the sense that their specific gravities are substantially below the specific gravities of other cementitious mixtures of corresponding aggregate content (if aggregate is used) and water-cement ratio. Generally speaking, this object is accomplished by artificially incorporating in the cement an amount of air substantially in excess of the quantity of air that normally would be contained in the dry cement, or put into a wet cementitious mixture as a possible incident of the usual operations for mixing water and cement. Accordingly, it is in this sense that we state that air is artificially held in the cement, i. e., by a medium other than the cement alone and by itself.

While in the broad aspects of the invention an amount of air required to give the mixed cement its desired low specific gravity may be incorporated in the cement artificially by any suitable medium, we prefer to employ a medium whereby small particles of air are held in direct association with or are mechanically entrapped with the individual cement particles. In accordance with the invention we admix or intergrind with the cement a filming material which adheres to the cement particles, and retains minute air films directly against the cement particles, or against the filming material. In this manner it becomes possible to retain in the cement an amount of air such that when the cement is for example made into a water slurry, the specific gravity of the slurry will be considerably below the specific gravity of a slurry composed of ordinary Portland cement and a corresponding percentage of water. As a preferred medium for entrapping air in the cement as described, we intimately admix or intergrind any suitable Portland cement with the proper percentage of a gasoline-insoluble wood resin, commercially known under the trade name "Vinsol." This gasoline-insoluble resin which we use, and refer to hereinafter simply as "the resin," may be produced by extracting resinous pine wood with a coal tar hydrocarbon, removing the hydrocarbon by evaporation, leaving a residue comprising a mixture of wood rosin and the gasoline-insoluble resin. This resin then is separated from the wood rosin by extracting the latter by a suitable petroleum hydrocarbon in which the wood rosin is soluble.

As another feature of the invention having major importance, the resin has been found to improve the plastic properties of Portland cements in general, and as to this aspect as well as the first started object of the invention, the advantages are not to be regarded as limited to Portland cements of any particular type or composition. For example, the plastic properties of a normal Portland cement manufactured by intergrinding the resin with Portland cement clinker containing the usual amount of gypsum, are markedly improved by the presence of the resin. Also, the resin has been found correspondingly effective for improving the properties of plastic Portland cements containing other materials adapted to increase the plasticity and workability of the finished cement. Although of secondary importance, another advantage in the use of the resin is its effectiveness as a grinding aid, i. e., an admixture that reduces the energy required to grind the clinker to a given fineness level. Like other grinding aids, the resin apparently acts as a dispersing agent, tending to free or disperse into the clinker being ground, fine particles that otherwise tend to build up in layers on the grinding media and wall of the mill and thereby prevent direct interaction between the grinding surfaces.

Referring particularly to plastic cements, the resin may be interground with Portland cement clinker containing other material adapted to give greater plasticity to the finished cement. We may use one, or a mixture, of two general types of such materials, the effect of which is to promote formation of particle size distribution and increased specific surface which enhance the plastic properties of the finished cement. One type of such materials may be classed as chemically inert substances, for example natural sand, and particularly sands relatively rich in free quartz such as result from weathering of granite rocks. The second type are active materials in the sense that they are reactive with lime released in the cement during hydration. Pouzzolanic materials, for example certain shales of marine origin occurring as marine sediments of Miocene Age in the Upper Puente of Southern California, are illustrative. These shales are characterized by their pronounced pouzzolanic activity. The Pouzzolan, like sand, has the effect of aiding in developing a product of particle size distribution and specific surface especially desirable for plastic cement, and it has the additional property, by reason of its capacity for reaction with lime released from the cement during hydration, of increasing the strength obtained in mortars at late ages.

The improved properties of a normal Portland cement interground with the resin in different proportions, are illustrated in Table I below. The control sample A consisted of 1816 grams of Portland cement clinker mixed with 69 grams of gypsum and subjected to two-stage grinding in a ball mill, the first stage consisting of 900 revolutions of the mill charged with 45 lbs. of 1¼" balls, and the second stage 1820 revolutions of the mill recharged with 70 lbs. of ⅜ to ½" balls. Samples B, C and D were cements prepared from the same stock as the control sample and differing in composition only in being interground with small amounts of the resin in the proportions indicated in the table. All samples were subjected to grinding under exactly the same conditions so that their differences in fineness are due solely to the presence of the resin. Samples B, C, and D are shown to have substantially larger proportions of particle sizes within the 0 to 20 micron range, and greater specific surfaces than the control sample. Net expansions in the standard autoclave test are but slightly higher for the samples interground with the resin, and for all practical purposes are as satisfactory as the control sample in this respect. Setting times and tensile strengths are satisfactory, although it is indicated that where, as in sample D, the resin content is increased to as high as 0.50%, the final setting time may be delayed and the initial tensile strength materially reduced. It is to be noted, however, that with such proportions of the resin present, the strength developed at periods such as seven days or longer is as high as the strength developed in cements of lower resin content. Although the setting times are somewhat longer for cements B, C and D, this is desirable for most work in which plastic cements are used. The outstandingly improved properties of cements B, C and D, however, are their superior plasticity and workability. Each of these cements when mixed with water in the percentages indicated for neat cement, displays exceptional plasticity and smoothness in working. When mixed with water in sand mortars such as are used in plaster or stucco construction, these cements exhibit unusual workability and highly desirable plastic properties.

For purposes of comparison, the table shows corresponding properties of an ordinary commercial plastic Portland cement, which is generally regarded as having good workability and plastic properties. Cements B, C and D are found to be superior to cement E in plastic properties, as demonstrated by workability tests, and to have these superior properties notwithstanding the fact that their finenesses are considerably below the fineness of cement E. This fact is of course significant in that the cements contemplated by the invention may be manufactured at considerable savings in grinding costs, and still surpass in plastic properties, the more finely ground plastic cements of ordinary compositions. Note also that in the tabulated comparison of the plaster mortar tensile strengths of samples B and E, the former shows substantially the same strengths as the commercial plastic cement at one day and three days, and a tendency to excel in strength at seven days.

*Table I*

| Sample | Composition | Percent | Fineness | | Grinding time | | Percent net expansion in autoclave | Percent water for N. C. | Setting time initial final | | | | Std. 1:3 tensile strength | | | Tensile strength plaster sand mortar | | |
|---|---|---|---|---|---|---|---|---|---|---|---|---|---|---|---|---|---|---|
| | | | 0/0–20 microns | Spec. surf. | 45 lb. 1¼" balls | 70 lb. ⅜–½" balls | | | Hr. | Min. | Hr. | Min. | 1D | 7D | 28D | 1D | 3D | 7D |
| A | Control | | 54.8 | 1953 | Rev. 900 | Rev. 1820 | +0.490 | 23.5 | 2 | 46 | 5 | 15 | 153 | 391 | 441 | | | |
| B | Resin | 0.10 | 57.3 | 2009 | ...do... | ...do... | +0.570 | 26.5 | 4 | 19 | 8 | 19 | 97 | 301 | 358 | 75 | 175 | 228 |
| C | ...do... | 0.25 | 60.2 | 1982 | ...do... | ...do... | +0.608 | 27.2 | 5 | 06 | 6 | 41 | 95 | 216 | 286 | | | |
| D | ...do... | 0.50 | 57.9 | 2043 | ...do... | ...do... | +0.584 | 28.0 | 5 | 18 | 16 | 10 | 39 | 270 | 329 | | | |
| E | Commercial plastic. | | 64.9 | 2545 | | | | 26.9 | 3 | 01 | 5 | 49 | | 295 | 323 | 77 | 177 | 214 |

Table II shows a comparison of properties between the same control sample given in Table I, and cements F to J prepared by intergrinding samples of the control stock with the resin and sand (samples F and G) and resin with pouzzolanic shale (samples H, I and J), in the percentages indicated. All samples were subjected to the same grinding time and procedure as has been set forth for the cements of Table I.

It will be noted that with the normal amount of grinding given cements in the series shown in Table II, cements F, G, H, I and J show relatively high finenesses as compared with the control sample. These cements have the advantage of requiring relatively small amounts of grinding energy to produce reasonably high finenesses. Table II also presents data for autoclave expansion. These data show that the resin and sand, and resin and pouzzolanic cements, exhibit materially less autoclave expansion than the control cement. It will be seen that this value may be in the order of one-half of the value obtained by the control cement. Workability tests have demonstrated that cements F, G, H, I and J are markedly superior to the control and previously known cements with regard to the plastic properties produced in neat pastes and in sand mortars such as are used for plaster and stucco work.

*Table II*

| Sample | Composition | Percent | Fineness | | Grinding time | | Percent net expansion in autoclave |
|---|---|---|---|---|---|---|---|
| | | | 0/0-20 microns | Specific surface | 45 lb. 1¼" balls | 70 lb. ⅜-½" balls | |
| A | Clinker | 96.34 | 54.8 | 1953 | Rev. 900 | Rev. 1820 | +0.490 |
| | Gypsum | 3.66 | | | | | |
| F | Clinker | 87 | 61.4 | 2005 | do | do | +0.276 |
| | Gypsum | 3.2 | | | | | |
| | Resin | 0.1 | | | | | |
| | Sand | 9.7 | | | | | |
| G | Clinker | 87 | 58.3 | 2059 | do | do | +0.288 |
| | Gypsum | 3.2 | | | | | |
| | Resin | 0.15 | | | | | |
| | Sand | 9.65 | | | | | |
| H | Clinker | 87 | 59.3 | 2216 | do | do | +0.240 |
| | Gypsum | 3.2 | | | | | |
| | Resin | 0.10 | | | | | |
| | Pouzzolan | 9.7 | | | | | |
| I | Clinker | 87 | 61.3 | 2238 | do | do | +0.274 |
| | Gypsum | 3.2 | | | | | |
| | Resin | 0.15 | | | | | |
| | Pouzzolan | 9.65 | | | | | |
| J | Clinker | 87 | 63.4 | 2236 | do | do | +0.260 |
| | Gypsum | 3.2 | | | | | |
| | Resin | 0.25 | | | | | |
| | Pouzzolan | 9.55 | | | | | |

While the tables show certain percentages of the resin, sand and pouzzolan to be used, these may be added in any suitable percentages productive of best results. Ordinarily the necessary amount of resin in either type of plastic cement need not exceed 0.50% by weight of the clinker mixture, and usually smaller percentages within the range of from 0.05% to 0.25% will suffice. The proportions of sand or pouzzolan normally will be under substantially 30% by weight of the entire clinker mixture. The tabulated finenesses also are typical only, since the resin desirably affects the properties of the cement in the respects noted where the cement is ground to fineness levels below or in excess of those given.

We have previously referred to the capacity of the resin when intimately admixed with the cement, as by intergrinding, to cause the finished cement to have thin films of air adsorbed upon its surface and to cause these films to be retained when the cement is mixed with water to form a slurry or other cementitious mixture. It is to be understood that this adsorbed air is not present as large bubbles or in a form such as to cause the slurry to exhibit foaming or frothing tendencies, but is present as extremely minute films distributed throughout the slurry mass on the cement particles. There may be, however, in addition to the air films adhering directly to the cement particles, more air incorporated in the slurry in the form of small air particles or bubbles between the cement particles and held or stabilized within the slurry by reason of the attraction for air, or air stabilizing effect, exhibited by the resin. As mentioned, one of the distinguishing characteristics, aside from increased plasticity and workability, of the present type of cement is its abnormally low specific gravity. Advantage may be taken of this property for various purposes where low density cements are desirable, and also for light weight concretes, for which purpose it may be desirable to utilize together with the present type of cement, suitable light weight aggregate such as the usual low density or specially made aggregates. In the discussion to follow, we refer to cements of the type contemplated generally by the invention, but in which the resin content is sufficiently high (and perhaps higher than may be required merely to enhance the plasticity and workability of the cement), say around 0.50% by weight of the dry cement, to substantially reduce the specific gravity of wet mixtures of the cement.

Included among additional distinguishing characteristics and properties of the present cement, is the capacity of a slurry made of the cement for being pumped easily and carried through the pumping system, piping, conduits, etc., with a minimum of applied pressure. The cement yields a slurry of unusual mobility as compared with slurries made from cements which have been used up to the present; that is to say, a slurry made from the present cement has the property of unusually high rate of increase in rate of flow with increases in pressure. Another desirable property of the cement is its capability of maintaining position after being placed in any particular location. This property is associated with yield point or the pressure required to cause the inception of flow in the slurry. Cements used heretofore exhibit yield points which are far below the desired level when made into slurries of pumpable consistency. Slurries made of the present cement have substantially higher yield points than have been obtained with the common Portland cements. The pumpability of such slurries is not impaired but is actually much greater because of the greater mobility of the slurry.

Slurries made of a mixture containing the present cement have the further desirable property of maintaining fluidity for a period of time sufficient to allow placement of the body of the slurry in desired locations remote from the place of mixing. Under such circumstances, the setting and hardening reactions of the cement must be so controlled that they are retarded to the extent that the fluidity of the slurry will not seriously be impaired by increasing rigidity resulting from the setting action of the cement. Cements of the present invention yield slurries which retain their fluidity and are pumpable for considerable periods of time even at relatively high temperatures. In this respect they compare favorably with the most satisfactory cements which are now in use.

The present cements are further characterized in a respect that distinguishes them from many cements heretofore known to the art, in that they may be ground to high finenesses and still display the described properties. In the past it has been common to grind cements coarsely to enhance some of the properties discussed above. However, this has not been a satisfactory means for obtaining such properties since coarsely ground cements tend to settle in slurry suspensions and segregation occurs. It is also difficult to produce workable slurries from such cements because coarsely ground cements tend to give harsh water-cement mixtures at all water-cement ratios. The invention permits the use of cements which are unusually finely divided and possessed of many desirable properties attributable to fine grinding, and at the same time enables the cement to display those properties which it has been attempted in the past to obtain by coarser grinding, but without the accompanying or resulting disadvantages mentioned.

As will be understood, the resin is incorporated in the cement in an amount determinable in accordance with the properties desired in the cement slurry or other cementitious mixture to be produced. This amount will usually be about 0.5%, or somewhat more, by weight of the finished cement, but may be varied within limits as required by the properties to be developed in the cement. In general, 0.5% by weight of the resin will produce satisfactory specific gravities and fluidity when the cement is mixed with water to form a slurry. Smaller amounts of resin will result in increased specific gravity and somewhat lower mobility of the slurry paste. The fineness to which the cement is ground may be that which is common for regular Portland cements or preferably somewhat higher. For example this fineness may be defined as a specific surface of 1500 to 1800 square centimeters per gram and preferably as high as 2200 square centimeters per gram, as determined by the instrument known as the Wagner turbidimeter which is described in Proceedings of the American Society for Testing Materials, vol. 33, part II, page 553, 1933.

Although it is preferred to intergrind the resin by introducing it into the unground clinker and gypsum as hereinabove described, other methods of distribution of the resin throughout the cement may also be employed. For example, if a two stage grinding process is used the clinker and gypsum may be ground without the resin in the first stage and the resin may be introduced following this grinding operation so that the resin-cement mixture is subjected to intergrinding in the second grinding stage. The resin may also be finely divided and merely mixed with finished cement in a suitable mixing apparatus or it may be distributed throughout the cement by such a process as that described in the co-pending application of Ira C. Bechtold, Serial Number 185,309 filed January 17, 1938.

The table below shows specific gravity data relating to slurries made with a cement produced in accordance with this invention as compared with specific gravity data obtained with a cement of ordinary type. The slurries were all prepared, as nearly as possible, by identical procedures of mechanical stirring. Cement A is the cement of this invention while cement B is the comparison cement of the ordinary type. Cement A is ground to a specific surface of about 2100 square centimeters per gram and contains 0.5% by weight of the resin.

*Table III*

| Water cement ratio by weight | Weight per cubic foot in pounds | |
|---|---|---|
| | A | B |
| 0.40 | 97 | 124 |
| 0.45 | 89 | 120 |
| 0.50 | 85 | 115 |
| 0.55 | 81 | 112 |

It is evident that cement A yields a slurry having a markedly lower specific gravity than does the ordinary cement, and other tests made, but not tabulated in detail, indicate its distinguishing and characteristic properties in the various other respects discussed in the foregoing. The specific gravity of the cement may be varied within substantial limits by varying its air content through regulation of the percentage of resin admixed or interground therewith, and fineness of grinding. For many purposes where an especially light weight cementitious mixture is desired, we may incorporate such a relatively high proportion of air in the cement, that such mixtures will have specific gravities far below the specific gravities of corresponding cementitious mixtures of other Portland cements. By intergrinding with the cement around 0.50% of the resin, it is possible to form a slurry (to cite a specific example and basis for comparison) having a water-cement ratio of 0.50 and a weight per cubic foot not substantially in excess of 90 pounds. Since weight per cubic foot is a common basis of designating weight or density of cement slurries, a light weight slurry as discussed above may be defined as one whose specific gravity corresponds to a per cubic foot weight below substantially the weight (90 pounds) stated.

We claim:

1. A Portland cement having air particles mechanically entrapped with the cement, said cement including in a mixture therewith a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon-insoluble resin being provided to aid in the entrapment of the air particles and the stabilization of said particles.

2. As a product, Portland cement containing a small percentage of a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon-insoluble resin being uniformly distributed throughout the cement.

3. As a product, Portland cement containing a paraffin hydrocarbon-insoluble resin, in the proportion of substantially 0.05% to 0.50% by weight of the cement, said paraffin hydrocarbon-insoluble resin having been produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins.

4. As a product, Portland cement containing a small percentage of a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon-insoluble resin being uniformly distributed throughout the cement and coating the individual particles thereof.

5. As a product, Portland cement having air particles mechanically entrapped with the cement, said cement including in a mixture therewith a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon insoluble resin substantially free from said soluble resins, said paraffin hydrocarbon-insoluble resin being mixed with said cement in the proportion of substantially 0.05% to 0.50% by weight of the cement, and said paraffin hydrocarbon-insoluble resin being uniformly distributed throughout the cement and coating the individual particles thereof to stabilize said particles throughout the cement.

6. As a product, a ground mixture of Portland cement and a silica-containing material adapted to increase the plasticity of the cement, and a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon resin being uniformly distributed throughout said mixture and coating the individual particles of said cement and silica-containing material therein.

7. As a product, a ground mixture of Portland cement and a silica-containing, lime reactive material adapted to increase the plasticity of the cement, and a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon-insoluble resin being uniformly distributed throughout said mixture and coating the individual particles of said cement and silica-containing material therein.

8. As a product, a ground mixture of Portland cement and sand and a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon-insoluble resin being uniformly distributed throughout said mixture and coating the individual particles of said cement and sand therein.

9. As a product, a ground mixture containing Portland cement and less than 30% by weight of sand, and from substantially 0.05% to 0.50% by weight of a paraffin hydrocarbon-insoluble resin produced by the extraction of comminuted pienwood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon-insoluble resin being uniformly distributed throughout said mixture and coating the individual particles of said cement and sand therein.

10. As a product, a ground mixture containing Portland cement and less than 30% by weight of pouzzolanic shale and from substantially 0.05% to 0.50% by weight of a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said paraffin hydrocarbon-insoluble resin being uniformly distributed throughout said mixture and coating the individual particles of said cement and shale therein.

11. Portland cement having air particles mechanically entrapped with the individual particles of cement, said cement including a mixture therewith of a paraffin hydrocarbon-insoluble resin produced by the extraction of comminuted pinewood by a coal tar hydrocarbon, the removal of the volatile substances from the extract to obtain a mixture of solid resins, the extraction of such mixture of solid resins by a volatile paraffin hydrocarbon to remove petroleum hydrocarbon-soluble resins from said resin mixture, and the recovery of said paraffin hydrocarbon-insoluble resin substantially free from said soluble resins, said cement and paraffin hydrocarbon-insoluble resin mixture when admixed with water to form a slurry at a water-cement ration of 0.50 having a specific gravity under that corresponding to a slurry weight of substantially 90 pounds per cubic foot.

IRA C. BECHTOLD.
HARRY E. KAISER.